United States Patent [19]
Lockett

[11] 4,338,052
[45] Jul. 6, 1982

[54] VARIABLE GEOMETRY ROUTER
[75] Inventor: James H. Lockett, San Pedro, Calif.
[73] Assignee: Northrop Corporation, Hawthorne, Calif.
[21] Appl. No.: 135,542
[22] Filed: Mar. 31, 1980
[51] Int. Cl.³ .............................................. B23C 1/06
[52] U.S. Cl. .............................. 409/206; 144/134 A; 144/144 A; 408/714; 409/175
[58] Field of Search ............... 409/204, 209, 211, 228, 409/229, 230, 231, 206, 175; 408/714, 237, 111; 144/134 A, 134 R, 134 D, 136 C, 144 R, 144 A; 279/16

[56]  References Cited
U.S. PATENT DOCUMENTS

| 2,479,588 | 8/1949 | Dixon | 409/209 X |
| 2,570,752 | 10/1931 | Benjamin et al. | 279/16 |
| 2,574,016 | 11/1951 | Burg | 279/16 |
| 2,596,821 | 5/1952 | Parkins | 276/16 |
| 2,891,427 | 6/1959 | Warsap et al. | 408/111 |
| 4,242,017 | 12/1980 | DeFazio | 408/111 |

FOREIGN PATENT DOCUMENTS 2719984 5/1978 Fed. Rep. of Germany ...... 409/229

Primary Examiner—William R. Briggs
Attorney, Agent, or Firm—James E. Crawford; John E. Peele, Jr.; Robert J. Stern

[57]    ABSTRACT

A router is mounted in a resilient support within a housing mounted on the end of a robot arm to permit substantial lateral movement of the router relative to the housing in any radial direction as the router traverses a template; the router being concentrically positioned within the housing in a resilient support positioned midway between the ends of the router.

3 Claims, 3 Drawing Figures

VARIABLE GEOMETRY ROUTER

BACKGROUND OF THE INVENTION

1. Field of the Invention

The present invention relates generally to improvements in cutting machines, and more particularly to improvements in the construction and operation of routers used in combination with a template and a robot manipulator arm.

2. Description of the Prior Art

Robot manipulator arms currently in use are computer programmed for straight-line motion from one computed point to the next computed point. When using a robot in a machining mode with standard router, any deviation from straight line motion requires extensive use of limited stored programmable computer points, thus reducing the robot's capability, and tendency to produce a contour in the form of a series of small flats.

PRIOR ART STATEMENT

The following patents are cited as typical of the type of routers relating to the present invention.

| U.S. PAT. NO. | DATE |
| --- | --- |
| 1,956,505 | April 24, 1934 |
| 2,549,024 | April 17, 1951 |
| 2,559,089 | July 3, 1951 |
| 2,827,836 | March 25, 1958 |

The one feature common in all the above cited references is that the cutting tool is held in a spindle which is, in turn, rotatably journaled in a housing in a way that assures that there is no possibility of lateral movement of the cutting tool relative to its housing.

In the present invention, the spindle is rotatably journaled in a motor which is contained within a housing that permits lateral movement of the cutting tool relative to the housing in any radial direction as the router traverses a template.

It is, of course, well known to provide motors with resilient or flexible mounts in housings such as in vacuum cleaners, cream separators, etc., as disclosed in the following patents:

| U.S. PAT. NO. | DATE |
| --- | --- |
| 2,183,372 | December 12, 1939 |
| 2,265,053 | December 2, 1941 |
| 2,307,538 | January 5, 1943 |
| 2,717,748 | September 13, 1955 |
| 3,325,126 | June 13, 1967 |

However, in the foregoing patents, the purpose of the resilient mounts is to damp vibration and reduce noise; hence the amount of lateral movement of the motor relative to the housing is minuscule.

While it is possible that more pertinent art exists, Applicant's search is believed to have been conducted with conscientious effort to locate and evaluate the closest prior art available at the time, but the statement is not to be construed as a representation that no better art exists.

SUMMARY OF THE INVENTION

The present invention relates to routers and more particularly to a router for use in combination with a robot manipulator arm.

Heretofore, it has not been practical to use a robot for machining curved parts. Since robots are programmed in straight-line motions from one point to another, the curvature of the finished machined part consists of a series of flats.

A primary object of the present invention is to provide a router which is of simple and compact construction, and highly efficient and accurate when used in combination with a robot and template tooling, to machine curved parts.

A further object of the router combination of the present invention is to produce smooth concave or convex machined surfaces of the required radius when used in combination with a programmed robot and a template.

A further object is to provide a router in which the router motor and spindle permit lateral movement within the router housing in any radial direction relative to the axis of rotation of the cutter spindle.

Another further object is to provide a router which can machine a smoothly curved part when used in combination with template tooling and robot manipulator arm which is programmed in a series of point-to-point straight-line motions.

Although the characteristic features of the present invention are particularly pointed out in the appended claims, other advantages will become clearly apparent from the following detailed description and drawings, all of which is intended to be representative of rather than in any way limiting on the scope of the invention.

DESCRIPTION OF THE PREFERRED EMBODIMENTS

Figure 1:
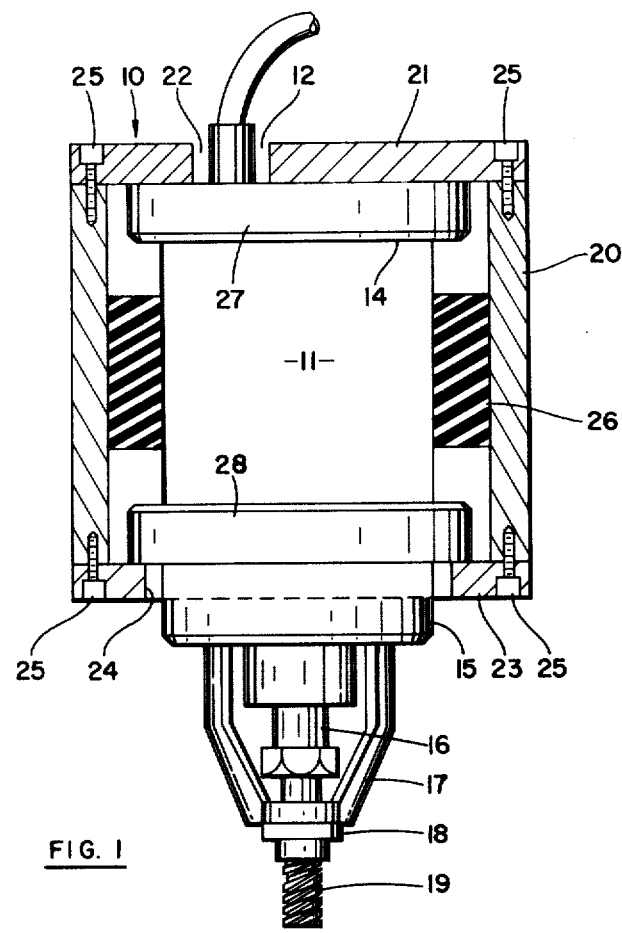
FIG. 1 is a side elevational view, partly in cross-section, of a router made in accordance with the present invention.
Figure 2:
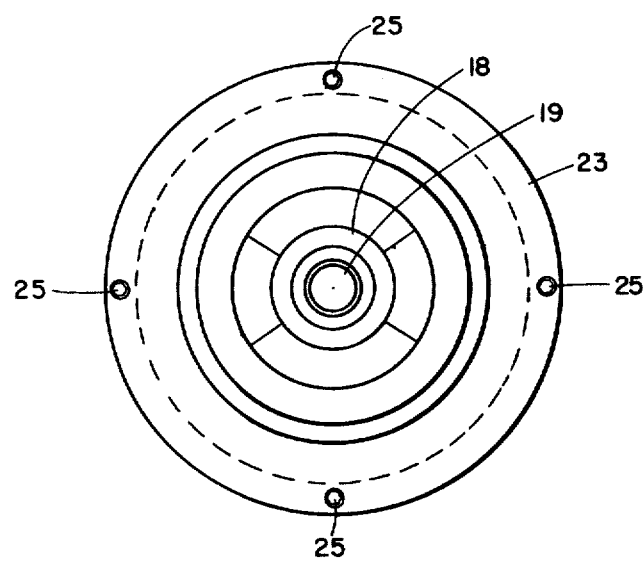
FIG. 2 is an end view of the router of the present invention.

Referring to FIG. 1, the router 10 is typical of the present invention. The router motor 11 is driven by compressed air, electrical current, or fluid drive means, the details of which are not shown since it is not intended to limit the present invention to any particular driving means. Power is supplied to the router motor 11 through a connector 12 located on an upper end 14 of the router motor 11. The lower end 15 of the router motor 11 is provided with a spindle 16 mounted coaxially with the longitudinal axes of the router motor 11 and a cage 17 which threadably holds a replaceable router setback collar 18. The spindle 16 releasably holds a standard router cutter 19 for rotation about the longitudinal axis of the router motor 11.

The router 11 is enclosed in a cylindrical housing 20 which has an end plate 21, with an opening 22 therethrough, which allows the connector 12 to move coaxially within the periphery of the opening 22. The housing 20 is also provided with an end plate 23 at its opposite end that has an opening 24 therethrough, allowing the second end 15 of the router motor 11 to move coaxially within the periphery of the opening 24. Both the upper plate 21 and the lower plate 23 are shown attached to the cylindrical housing 20 by a plurality of bolts 25; however, any convenient means may be employed for this purpose.

The router motor 11 is centered coaxially within the cylindrical housing 20, surrounded midway between its ends within a ring 26 of resilient material, preferably an elastomer type material; or other suitable material. Longitudinal movement of the router motor 11 within the housing 20 is prevented by a first metal collar 27 located on the end 14 of the router motor 11 and by a second metal collar 28 located on end 15 of the router motor 11. Both the first collar 27 and the second collar 28 are maintained in a sliding fit between plate 21 and plate 23, and restricts the movement of the router motor 11 within the cylindrical housing 20 to a plane 90° relative to the longitudinal axis of the spindle 16.

Figure 3:
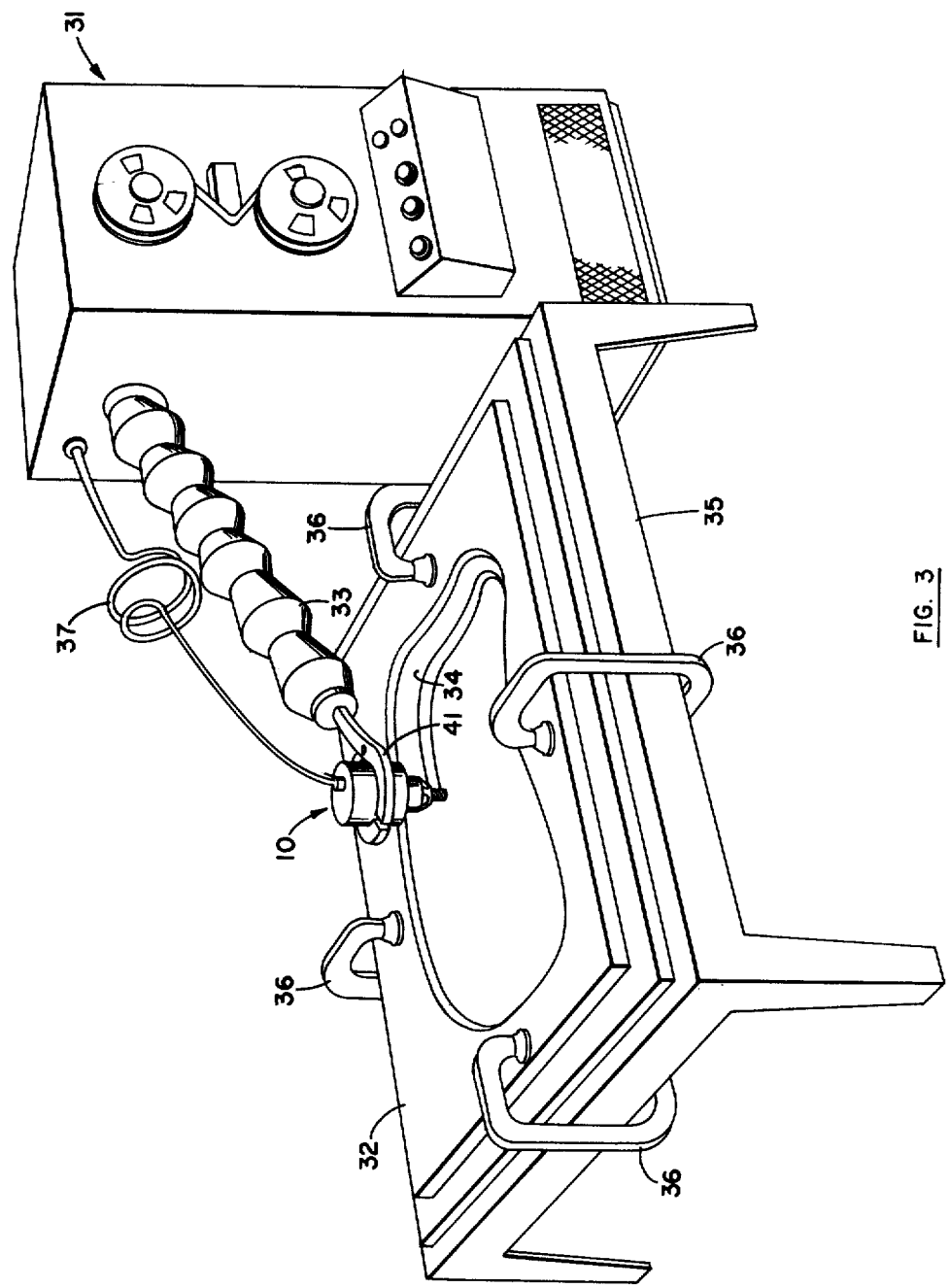
FIG. 3 is a diagrammatic perspective view of the present router in an assembled relationship with one form of a computer operated robot and template tooling.

Referring to FIG. 3, while the present invention is shown as being applicable to a particular type of robot 31 and template 32 of a specific configuration for milling a certain desired pattern 40, it is not intended to unnecessarily restrict the scope or utility of the invention to specific features shown in FIG. 3; and it is contemplated that specific descriptive terms employed herein be given the broadest possible interpretation consistent with the disclosure.

The router 10 is shown releasably attached to a robot manipulation arm 33 by a claw 41. It is obvious that the router 10 can be provided with any type of attachment required to mate with various manipulation arms now in common use. In practice, the present router 10 is guided by the combination of a computer programmed robot 31 and a template 32, the template 32 being releasably mounted over, a work piece 34 and a table 35 by clamps 36. Power to operate the router 10 is supplied by a line 37. The computer programmed robot 31 is programmed for point-to-point movement along the contour of the pattern 40 using perhaps twenty-five percent of the program points normally required when using a standard router.

It will be seen that substantial lateral movement of the router 11 in any radial direction is permitted by ring 26 as the router traverses template 32; to produce smooth curved contours during the point-to-point movement and thus provides a smoothly curved part from a series of straight-line motions.

While in order to comply with the statute, the invention has been described in language more or less specific as to structural features. It is understood that the invention is not limited to the specific features shown, but that the means and construction herein disclosed comprise one form of putting the invention into effect and the invention is, therefore, claimed in any of its forms or modifications within the legitimate and valid scope of the appended claims:

I claim:

1. A router for machining curved surfaces in plates or the like, comprising:
    (a) a cylindrical housing including upper and lower end plates,
    (b) a router motor enclosed longitudinally in said cylindrical housing;
    (c) resilient means supporting said router coaxially within said housing, and positioned midway between the ends of said router;
    (d) collar means located on each end of said router motor adapted to prevent longitudinal movement of said router motor within said housing, said resilient means permitting controlled lateral movement in any radial direction of said router motor within the housing.

2. The router set forth in claim 1 in which said resilient means is made of an elastomer material.

3. A router comprising:
   a housing;
   two flat plates attached to the housing, the two plates being oriented parallel to each other and perpendicular to a reference line, and the two plates being spaced apart from each other along the reference line;
   a motor slidably mounted between the two plates so as to permit movement of the motor relative to the housing only in a plane parallel to the two plates;
   a spindle connected to and driven by the motor so as to rotate about an axis parallel to the reference line, the spindle being adapted for holding a router cutter; and
   resilient means, arranged about the motor, for applying to the motor a restoring force in the direction opposite to the direction in which the spindle axis is displaced from the reference line.

* * * * *